May 3, 1955  N. A. NELSON  2,707,643
TRACTOR-IMPLEMENT HITCH MECHANISM
Filed March 31, 1951  2 Sheets-Sheet 2

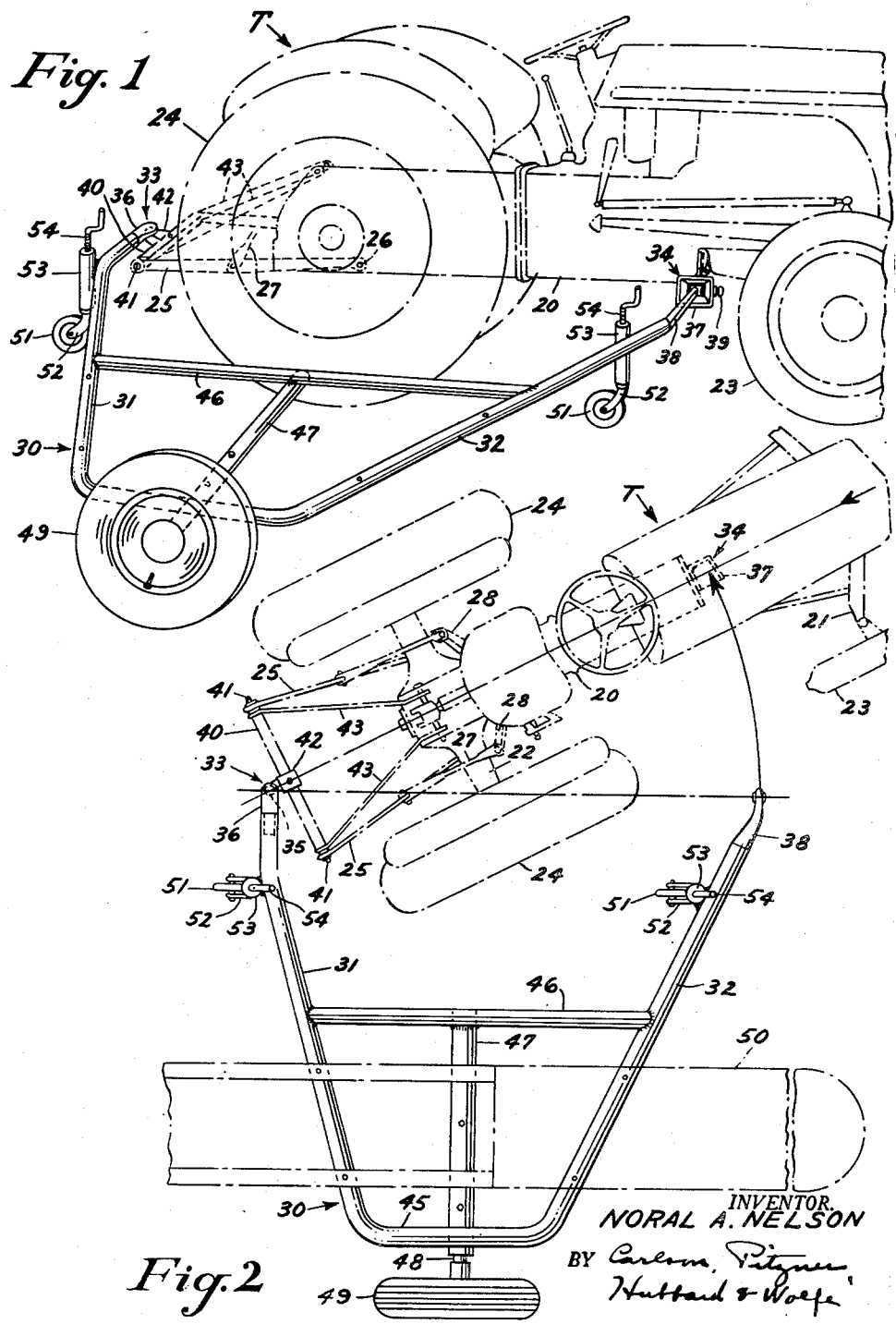

INVENTOR.
NORAL A. NELSON
BY
ATTORNEYS

United States Patent Office 2,707,643
Patented May 3, 1955

2,707,643
TRACTOR-IMPLEMENT HITCH MECHANISM

Noral A. Nelson, Detroit, Mich., assignor to Harry Ferguson, Inc., Detroit, Mich., a corporation of Delaware Application March 31, 1951, Serial No. 218,636

5 Claims. (Cl. 280—456)

The invention relates to hitch mechanisms for connecting implements to tractors.

Arrangements are well known for ready attachment of mounted implements to tractors. For example, the "Ferguson" tractor is provided at its rear end with a set of three hitch links, each having a swivel mounted apertured ball on its trailing end. To attach a mounted implement, one has only to insert three triangularly located pins on the implement in corresponding ones of the balls. Except when actually working, the entire weight of the implement is thus borne by the tractor.

Some implements are, however, so bulky and heavy that they cannot be accommodated on such a three-point hitch. Examples are combines, forage harvesters, hay balers, etc. The weight and dimensions of those implements are such that they can, at most, be arranged only in a semi-mounted style, that is to say, with at least some portion of their bulk supported on a separate ground wheel and the remainder supported on the tractor. It is with the solution of the problems of attaching such semi-mounted implements to a tractor that the present invention is concerned.

One object of the invention is to provide a hitch mechanism for attachment of semi-mounted implements which simplifies the task of connecting the implement to or disconnecting it from a tractor so that one man can do the job quickly with little effort, with complete safety and without requiring any complicated maneuvering of the tractor.

More particularly, it is an object of the invention to provide a hitch mechanism of the general character indicated, adapted for connection with the tractor at two longitudinally spaced points and constructed and arranged so that the connection at one point may be made by simply driving the tractor alongside the implement, such connection permitting relative pivoting of the implement on a vertical axis upon further movement of the tractor whereby the implement is caused to jackknife toward the tractor and automatically complete the connection at the other point.

Another object is to provide connecting elements for the hitch mechanism which can be engaged by a simple jackknifing movement of the implement with respect to the tractor.

It is also an object of the invention to provide hitch mechanism which effectively maintains the implement properly positioned at the side of the tractor and yet permits the implement to float freely relative to the tractor in passing over uneven ground.

Other objects and advantages of the invention will become apparent from the following detailed description of the preferred embodiment illustrated in the accompanying drawings, in which:

Figure 1 is a partly diagrammatic side view of a tractor and semi-mounted implement connected by a hitch mechanism embodying the features of the invention.

Fig. 2 is a plan view of a tractor and implement showing the hitch mechanism in process of being engaged.

Figure 3:
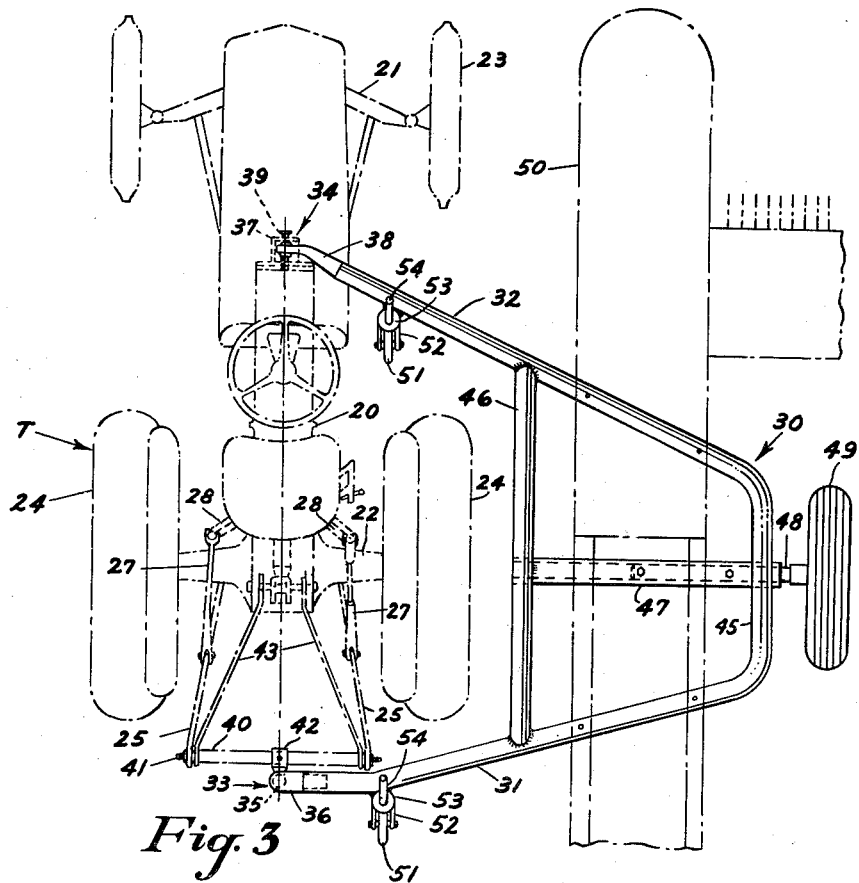
Fig. 3 is a plan view of a tractor and implement showing the hitch mechanism fully engaged.

For purposes of illustration, the hitch mechanism comprising the invention has been shown in a form particularly suitable for connecting semi-mounted implements with a light weight four-wheeled agricultural tractor. It is to be understood that the hitch mechanism is not limited to use with that particular type of tractor, nor is its use restricted to the implement illustrated by way of example. It is also to be understood that various changes, modifications and adaptations may be made in the form, construction and arrangement of the parts of the mechanism without departing from the spirit and scope of the invention as expressed in the appended claims.

Referring to the drawings, the tractor T with which the improved hitch mechanism is shown has an elongated body 20, front and rear axles 21 and 22, front wheels 23, and rear wheels 24, the latter constituting the drive wheels. The exemplary tractor is equipped with a power-operated hitch linkage of the type disclosed in the Ferguson Patent No. 2,118,180, dated May 24, 1938, including a pair of forwardly converging draft links 25, pivoted at their forward ends as at 26 on the tractor body below and slightly forward of the rear axle 22. The links 25 are supported by drop links 27 from power-operated crank arms 28 pivoted on the tractor body. These draft links or lower links, as they are sometimes called, are utilized to transmit the draft force from the tractor to the hitch mechanism and the implement associated therewith, as will appear presently.

In carrying out the invention a frame 30 is provided on or in association with the implement, such frame being constructed to present two members 31 and 32 spaced apart fore-and-aft of the implement and projecting generally laterally at one side thereof for connection with the tractor. The connection with the tractor is effected by couplings 33 and 34, each including an element on one of the frame members and a cooperating element carried by the tractor, the latter element being situated so as to be freely accessible to its associated frame member when such member is moved laterally of the tractor. One of the couplings is constructed and arranged so that the elements may be engaged quickly and easily as by simply driving the tractor forwardly or backwardly into a predetermined position with reference to the implement. That coupling is further constructed and arranged so as to permit pivoting of the implement about a substantially vertical axis upon further movement of the tractor whereby the implement is caused to swing around or jackknife toward the tractor to engage the elements of the other coupling, such jackknifing being free of obstruction by any wheel of the tractor.

While either coupling may be utilized for effecting the initial connection between the tractor and the implement as above described, the rear coupling 33 has been shown as designed for that purpose in the exemplary embodiment illustrated. The coupling may be of any preferred construction as, for example, a simple ball and socket device, including a ball element 35 (Fig. 4) carried by the tractor and a socket element 36 carried by the frame member 31 adjacent its outer or free end.

To simplify and facilitate the completion of the connection between the tractor and the implement, the companion coupling is constructed and arranged so that its elements are automatically engaged as an incident to the jackknifing of the implement relative to the tractor. When connection is effected initially with the rear coupling 33, as herein shown, the front coupling 34 is constructed for effecting the final connection. To this end it comprises a laterally opening socket element 37 carried by the tractor and a prong shaped element 38 carried on the frame member 32 and adapted to be received in the socket element.

The socket element 37 may be mounted on the tractor in any suitable manner and in any preferred position such that registry of the element 38 therewith may be effected incident to the positioning of the frame 30 about the coupling 33 and without obstruction by either the front or the rear wheel of the tractor. In other words, the socket element 37 is to be located at some point adjacent the tractor along the arc described by the element 38 in the pivoting of the hitch frame. As herein shown, the socket element 37 is mounted on the underside of the tractor body 20 substantially on the center line of the tractor and closely adjacent the point at which the tractor engine is connected to the tractor body.

To insure proper entry of the element 38 into the socket element 37 without necessitating accurate alinement or positioning of the elements, the element 37 is formed with outwardly flaring walls which serve to guide the element 38 into a socket recess provided at the inner end of the element 38. The elements 37 and 38 when engaged may be secured together in any suitable manner as by a pin 39 inserted therethrough, the pin being disposed so as to permit relative pivoting of the elements on a horizontal axis. As the rear coupling element 33 permits universal pivoting movement between the frame member and the tractor, the implement is thus secured to the tractor so that it may float or move freely relative thereto when passing over uneven ground.

Since the draft force developed by the tractor is transmitted to the implement through the lower or draft links 25 as above explained, the ball element 35 of the rear coupling 33 is carried by such lower links. The means provided in association with the links for carrying the coupling element may be of any suitable character. Preferably it is arranged to locate the element at the rear of the tractor in a position such that it may be engaged with the companion coupling element with maximum convenience. Such position is dependent upon the type of implement involved and on other factors and may be anywhere between a point lying outside the track of the right driving wheel 24 and a point substantially on the center line of the tractor, the position in which it has been shown in the exemplary embodiment of the invention.

The simple but effective means shown herein for carrying the coupling element 35 comprises a rigid drawbar 40 having pins 41 projecting at opposite ends for engagement in the apertured balls provided in the trailing ends of the links 25. A bracket 42 to which the element 35 is attached, or of which it may form an integral part, is suitably secured to the drawbar, in this instance, substantially centrally of the bar. As the lifting action of the hitch linkage is ordinarily not required in the operation of semi-mounted implements, the drawbar 40 is locked in fixed position by stay bars 43 extending between the ends of the drawbar and suitable anchoring means on the tractor body.

The frame 30 may be of any suitable shape and of any preferred construction so long as it provides the laterally projecting members for connection with the tractor as above described. In the particular frame structure illustrated, the frame members 31 and 32 constitute opposite end portions of an elongated tubular bar bent into generally C-shaped configuration, as shown in Figs. 2 and 3. The intermediate portion 45 of the bar is preferably straight and disposed substantially parallel to the longitudinal axis of the implement. A reinforcing member 46 spaced from and parallel to the intermediate portion 45 extends between the members 31 and 32 to impart strength and rigidity to the frame.

Figure 4:
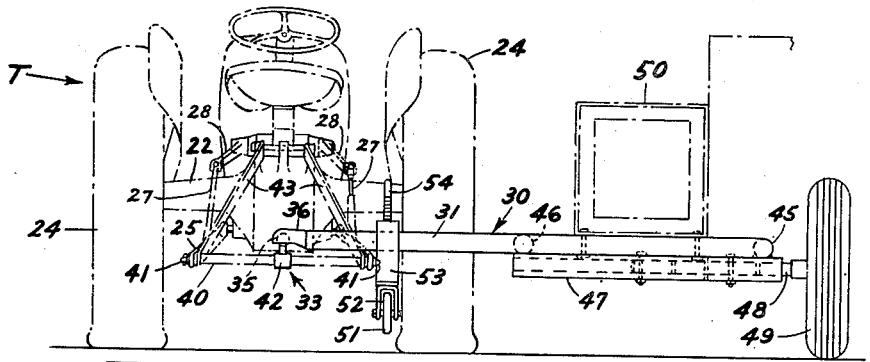
Fig. 4 is a rear elevational view of a tractor and attached implement.

A frame of the type above described may be constructed as an independent unit and secured to the implement frame in any desired manner, or it may be constructed to form an integral part of the implement frame as shown herein. In the latter case a tubular housing 47 is secured between the cross member 46 and the intermediate portion 45 of the frame for journaling an axle 48 mounting an outboard implement wheel 49. The body 50 of the implement is adapted to rest on the frame and is bolted or otherwise secured to the frame members 31 and 32, as shown in Fig. 4.

Means is desirably provided for cooperating with the ground wheel 49 in supporting the implement in an upright position when disconnected from the tractor. More particularly, the supporting means is arranged to serve as a guide and present the coupling elements 36 and 38 at a level such that the companion coupling elements 35 and 37 on the tractor may be engaged therewith by simply driving the tractor forwardly or rearwardly. As herein shown, the supporting and guiding action is provided by caster wheels 51 mounted on the frame members 31 and 32 adjacent their outer or free ends. Each of the caster wheels is journaled in a fork 52 mounted for swiveling movement about a vertical axis in a supporting sleeve 53 welded or otherwise rigidly attached to the associated frame member. Crank operated adjusting screws 54 are provided on each sleeve for retracting the wheels from the ground, as shown in Fig. 4, when the implement is in use and for lowering the wheels to ground engaging position when the implement is to be disconnected from the tractor.

A tractor and implement equipped with the improved hitch mechanism may be quickly and easily coupled for operation by one man without requiring any heavy lifting or shifting of the implement and without requiring complicated maneuvering of the tractor. Assume, by way of example, that the implement and tractor are disconnected and that the implement is supported jointly by the ground wheel 49 and caster wheels 51. Since in the exemplary organization the rear coupling element 33 is engaged initially, it is only necessary to back the tractor toward the implement until the coupling elements 35 and 36 are substantially in registration. The particular angle at which the tractor approaches the implement is immaterial and moreover, it is immaterial whether the tractor is backed in a straight line or whether the front wheels are turned to swing toward or from the implement. When the rear coupling elements are brought into alinement, they may be engaged by simply retracting the rear caster wheel 51 and allowing the weight of the implement to engage the socket element 36 over the ball 35.

Upon engagement of the rear coupling elements as above described, continued backward movement of the tractor results in the swinging or jackknifing of the implement relative to the tractor about the pivotal connection provided by the coupling 33 so that the front frame member 32 is swung inwardly as indicated by the arrow in Fig. 2. As the implement and tractor approach the relative positions shown in Fig. 3, the coupling element 38 is engaged in the coupling element 37 on the tractor. The front caster wheel 51 thus guides the connecting element 38 into the socket element 37 and the flaring construction of the socket element facilitates proper entry of the element 38 therein. Upon engagement the coupling elements may be secured together by insertion of the pin 39. Retraction of the front caster wheel 51 then conditions the tractor-implement assembly for operation.

Disconnection of the implement from the tractor is effected with equal ease. Preliminary to such disconnection the front caster wheel is lowered into ground engaging position and the locking pin 39 is withdrawn from the front coupling 34. When the tractor is now driven forwardly the implement will swing or jackknife outwardly from the coupled position shown in Fig. 3 to the position shown in Fig. 2. With the tractor and implement in such relative positions, the rear caster wheel 51 may be lowered to engage the ground and lift the rear portion of the frame sufficiently to disengage the socket element 36 from the ball 35. This completely frees the implement from the tractor and the latter may be driven away while the implement remains supported on the outboard and caster wheels as heretofore described.

It will be apparent from the foregoing that the invention provides hitch mechanism of novel and advantageous character, particularly well adapted for connecting semi-mounted implements with a tractor. Through the medium of this hitch mechanism the connecting and disconnecting can be done by one man very quickly and safely and without complicated maneuvering of the tractor. More particularly, it is only necessary to maneuver the tractor to aline one set of coupling elements. Thereafter continued movement of the tractor is effective to swing the implement in toward the tractor and automatically engage the companion coupling elements. The connection provided is effective to maintain the implement properly positioned at the side of the tractor and yet permit it to float freely relative to the tractor when passing over uneven ground. In general, the improved hitch mechanism affords a substantial saving in the time required to change implement assemblies and thereby materially increases the availability of the tractor for useful work.

I claim as my invention:

1. In a hitch device for connecting a semi-mounted implement to a tractor having a power-operated hitch linkage trailingly pivoted at its rear end portion, the combination of a frame having an outboard side and an inboard side, said frame also having at its outboard side a ground wheel about which the frame is overbalanced toward the inboard side, said frame including a pair of members projecting laterally at the inboard side thereof and spaced apart fore-and-aft so as to locate one member rearwardly of the tractor and the other member forwardly of the center of the tractor, coupling means for establishing a disengageable connection between said one frame member and the tractor hitch linkage including cooperating coupling elements respectively carried by said one member and by the tractor hitch linkage, said coupling elements being shaped and positioned to operatively engage upon vertical movement of one element relative to the other and to define when engaged a vertically disposed pivot about which the frame may swing relative to the tractor as it pivots on said ground wheel, and a second pair of coupling elements respectively carried by the tractor and said other frame member, said coupling element of said second pair carried by the tractor being free of lateral alinement with the wheels of said tractor, said second pair of coupling elements being shaped and positioned to operatively engage upon movement of one element relative to the other in a horizontal plane incident to the pivoting of the frame on said ground wheel and its swinging upon said first-mentioned coupling elements, and means for supporting and guiding said frame during said pivoting and swinging thereof.

2. Hitch mechanism for releasably connecting a tractor and a wheeled semi-mounted implement comprising, in combination, a frame rigid with the implement, an outboard ground wheel about which said frame is overbalanced laterally toward the inboard side, spaced front and rear members projecting laterally from the inboard side of the implement, connecting elements mounted respectively on said front and rear frame members, cooperating connecting elements mountable on said tractor in spaced relation fore-and-aft therealong, the rear element on said tractor being positioned to receive the companion connecting element on the rear frame member upon relative movement of the elements in a vertical plane and to cooperate therewith in pivotally connecting said frame to the tractor, the front element on the tractor being positioned to receive the connecting element on the front frame member without interference from the tractor wheels upon relative movement of the elements in a horizontal plane, the elements providing the rear connection being constructed and arranged to permit said frame to swing relative to the tractor about a vertical axis as the implement pivots on said ground wheel to effect engagement and disengagement of the elements providing the front connection in response to forward and backward movements of the tractor, and means for supporting and guiding said front connection of said frame relative to said front element on the tractor.

3. A hitch mechanism for connecting a semi-mounted implement in side-by-side relation to a tractor, comprising, in combination, a frame having a ground wheel at its outboard side and laterally projecting front and rear beams at its inboard side spaced apart to substantially embrace a rear traction wheel of the tractor from the outer side thereof with the rear beam located behind such traction wheel and the front beam located forward of it but clear of the front wheel of the tractor, and means for disengageably coupling said beams respectively to the rear end portion of the tractor and to a laterally accessible forward point on the same, said coupling means at the rear of the tractor being constructed and arranged to leave said frame and tractor free to swing laterally with respect to each other while still coupled, so that when the front coupling is released forward or rearward travel of the tractor will result in a pivoting of the implemnet on said ground wheel with a jackknifing motion of said frame relative to the tractor and correspondingly away from or toward the tractor, and means for supporting and guiding said frame during said jackknifing motion.

4. A hitch mechanism for connecting a semi-mounted implement in side-by-side relation to a tractor, comprising, in combination, a frame having a ground engaging wheel at one side and laterally projecting spaced front and rear members at the other side, means for disengageably coupling said front and rear members to the tractor at points spaced longitudinally thereon and providing free access of said members to said points laterally of said tractor, said points forming front and rear connections, one of said connections including pivot members constructed and arranged to permit when connected a jackknifing action of said frame and tractor responsive to forward and rearward motion of the tractor when the other connection is disconnected, said jackknifing action occurring free of obstruction by any wheel of the tractor, and means for supporting and guiding said frame relative to said other connection during said jackknifing action.

5. A hitch mechanism for connecting a tractor and side-mounted implement in side-by-side relation, comprising, in combination, a frame having a ground wheel adjacent its outboard side and fore and aft spaced members, front and rear means projecting laterally at its inboard side for connecting said frame members to the tractor at points spaced fore and aft on the latter and providing free access of said members to said points laterally of the tractor, one of said connecting means including co-acting pivot members constructed and arranged so that when connected they permit pivoting of the implement on said ground wheel with lateral swinging movement of said frame relative to the tractor responsive to forward and rearward movement of the tractor, said lateral swinging movement being free of obstruction by any wheel of the tractor, the other of said connecting means including members constructed and arranged to automatically engage or disengage responsive to said swinging movement, and means for supporting and guiding said frame relative to said other connecting means during said swinging movement.

References Cited in the file of this patent

UNITED STATES PATENTS

| | | |
|---|---|---|
| 1,291,813 | Engelhardt | Jan. 21, 1919 |
| 1,379,655 | Stettler | May 31, 1921 |
| 1,708,922 | Loots | Apr. 9, 1929 |
| 2,061,234 | Hoflich | Nov. 17, 1936 |
| 2,335,942 | Hyman | Dec. 7, 1943 |
| 2,416,731 | Baldwin | Mar. 4, 1947 |
| 2,512,097 | Goodspeed | June 20, 1950 |
| 2,534,109 | De Witt | Dec. 12, 1950 |